United States Patent [19]

Hase et al.

[11] Patent Number: 4,823,617
[45] Date of Patent: Apr. 25, 1989

[54] TORQUE SENSOR

[75] Inventors: Hiroyuki Hase, Katano; Shinya Tokuono, Ashiya; Masayuki Wakamiya, Suita, all of Japan

[73] Assignee: Matsushita Electric Industrial Co., Ltd., Osaka, Japan

[21] Appl. No.: 218,827

[22] Filed: Jul. 14, 1988

[30] Foreign Application Priority Data

Jul. 16, 1987 [JP] Japan .................. 62-177462

[51] Int. Cl.[4] .............................................. G01L 3/10
[52] U.S. Cl. ................... 73/862.36; 73/862.33
[58] Field of Search ............. 73/862.36, DIG. 2, 779, 73/862.33; 324/209

[56] References Cited

U.S. PATENT DOCUMENTS

| 4,506,554 | 3/1985 | Blomkvist et al. ............... 73/862.36 |
| 4,625,562 | 12/1986 | Yamashita et al. ............. 73/DIG. 2 |
| 4,780,671 | 10/1988 | Hase et al. .................... 73/862.36 X |

FOREIGN PATENT DOCUMENTS 5977326 10/1982 Japan .

OTHER PUBLICATIONS

Yamasaki et al., "Torque Sensors Using Wire Explosion ... Layers", IEEE Trans. on Mag., vol. MAG-22, No. 5, Sep. 1986.

Primary Examiner—Charles A. Ruehl
Attorney, Agent, or Firm—Spencer & Frank

[57] ABSTRACT

A torque sensor comprising strips of an amorphous magnetic alloy fixed to the surface of a rotary shaft so as to utilize a inverse magnetostrictive effect of the amorphous magnetic alloy is operated in a state in which a predetermined amount of internal compressive strain is previously produced in the strips, so that the torque sensor can operate without any temperature-dependent change in its sensitivity and without occurrence of a hysteresis of its output.

5 Claims, 9 Drawing Sheets

TORQUE SENSOR

BACKGROUND OF THE INVENTION

1. Field of the Invention

This invention relates to a torque sensor in which a inverse magnetostrictive effect of an amorphous magnetic alloy is utilized so that the absolute value and direction of a torque applied on a rotary shaft can be detected without making any contact with the rotary shaft.

2. Description of the Related Art

A torque sensor using a magnetostrictive amorphous magnetic alloy is known and has a structure as shown in FIG. 11. Referring to FIG. 11, a pair of elongate strips 2a and 2b of the magnetostrictive amorphous magnetic alloy are helically bonded to a rotary shaft 1 to make angles of +45° and −45° respectively with respect to the axial direction of the rotary shaft. At corresponding locations outside of the portions of the rotary shaft 1 where the strips 2a and 2b of the amorphous magnetic alloy are bonded, a pair of coils 3a and 3b are disposed in a relation coaxial with and spaced apart by a predetermined distance from the rotary shaft 1, respectively. When a torque is applied on the rotary shaft 1, a strain is produced in each of the strips 2a and 2b of the amorphous magnetic alloy, and the permeabilities of the respective strips 2a and 2b change due to the inverse magnetostrictive effect of the amorphous magnetic alloy thereby causing corresponding changes in the inductances of the respective coils 3a and 3b. The change in the permeability of the strip 2a of the amorphous magnetic alloy helically bonded to the rotary shaft 1 at the angle of +45° with respect to the direction of the thrust differs from that of the strip 2b of the amorphous magnetic alloy helically bonded to the rotary shaft 1 at the angle of −45° with respect to the direction of the thrust. Therefore, when an output representing the difference between the inductances of the coils 3a and 3b is detected by suitable electrical circuits, the magnitude and direction of the torque applied on the rotary shaft 1 can be detected.

In the prior art torque sensor having the structure shown in FIG. 11, the strips of the amorphous magnetic alloy are bonded to the shaft (JP-A No. 59-77326). However, it is very difficult to make the coefficient of thermal expansion of the amorphous magnetic alloy to completely coincide with that of the material of the shaft. Accordingly, when the torque sensor is placed to operate in an environment where there is a relatively great change in the ambient temperature, the strips of the amorphous magnetic alloy are subjected to internal tensile deformation or internal compressive deformation in the directions parallel to the surface of the shaft from the shaft depending on the conditions including the bonding temperature of the amorphous magnetic alloy, the difference between the coefficient of thermal expansion of the amorphous magnetic alloy and that of the material of the shaft and the operating temperature of the torque sensor. A change in the operating temperature of the torque sensor results in a corresponding change in the amount of strain imparted from the shaft to the strips of the amorphous magnetic alloy. Thus, the prior art torque sensor has been defective in that not only the sensitivity to an applied torque changes but also a hysteresis occurs in the sensor output when the operating temperature changes.

SUMMARY OF THE INVENTION

It is an object of the present invention to provide a torque sensor of the type in which strips of the amorphous magnetic alloy are fixed to the surface of the rotary shaft to utilize the inverse magnetostrictive effect of the amorphous magnetic alloy and which can operate over a wide temperature range without any temperature-dependent change in its sensitivity and without occurrence of the hysteresis of the sensor output.

In accordance with the present invention which attains the above object, there is provided a torque sensor comprising a rotary shaft, a pair of strips of a magnetostrictive amorphous magnetic alloy helically fixed to the surface of the rotary shaft to make angles of +45° and −45° respectively with respect to the axial direction of the rotary shaft, a pair of independent coils disposed outside of the respective strips of the amorphous magnetic alloy in a relation coaxial with and spaced apart by a predetermined distance from the rotary shaft, and electrical means detecting a strain produced on the surface of the rotary shaft due to transmission of a torque to the rotary shaft by detecting changes in the inductances of the coils due to changes in the permeabilities of the strips of the amorphous magnetic alloy, thereby detecting the magnitude and direction of the torque on the basis of the difference between the inductances of the coils, wherein the saturation magnetostrictive constant of the amorphous magnetic alloy is selected to lie within a range of $3 \times 10^{-6}$ to $35 \times 10^{-6}$, the coefficient of thermal expansion of the amorphous magnetic alloy is selected to be smaller than that of the material of the rotary shaft so that the torque sensor operates in a state in which a predetermined amount of internal compressive strain whose direction is parallel to the surface of the shaft is previously produced in the strips of the amorphous magnetic alloy.

DESCRIPTION OF THE PREFERRED EMBODIMENTS

Figure 1:
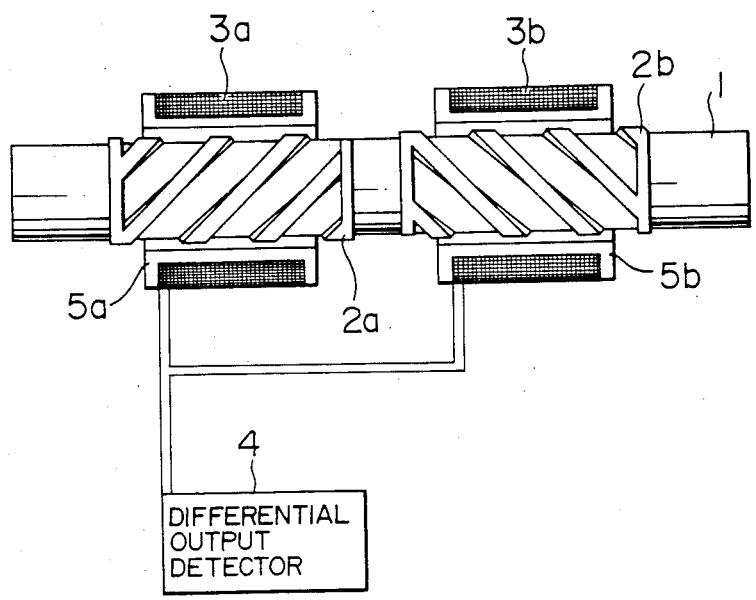
FIG. 1 is a partly cut-away, front elevation view to show the structure of an embodiment of the torque sensor according to the present invention.
Figure 11:
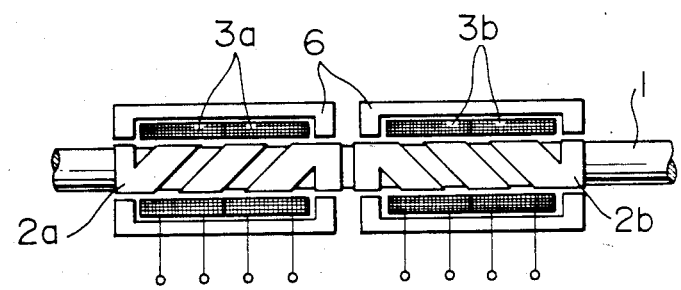
FIG. 11 is a partly cut-away front elevation view showing the structure of a conventional torque sensor.

FIG. 1 shows the structure of a first embodiment of the torque sensor according to the present invention, and, in FIG. 1, like reference numerals are used to designate like parts appearing in FIG. 11.

Referring to FIG. 1, the torque sensor includes a rotary shaft 1 made of, for example, metallic titanium having a coefficient of linear thermal expansion of $9.4 \times 10^{-6}$ (1/°C.) in a temperature range of $-30°$ C. to $250°$ C., a diameter of 20 mm and a Young's modulus of 11600 (kg/mm$^2$).

Strips of an amorphous magnetic alloy having a width of 40 mm, a thickness of 20 to 35 μm and a length of 20 m were made in air using single roller quenching method. The composition of the amorphous magnetic alloy was Fe-Cr-Si-B, and its saturation magnetostriction was $22 \times 10^{-6}$. Further, the amorphous magnetic alloy had a coefficient of linear thermal expansion of $7.8 \times 10^{-6}$ (1/°C.) which was smaller by $1.6 \times 10^{-6}$ (1/°C.) than that of the material of the rotary shaft 1.

Figure 2:
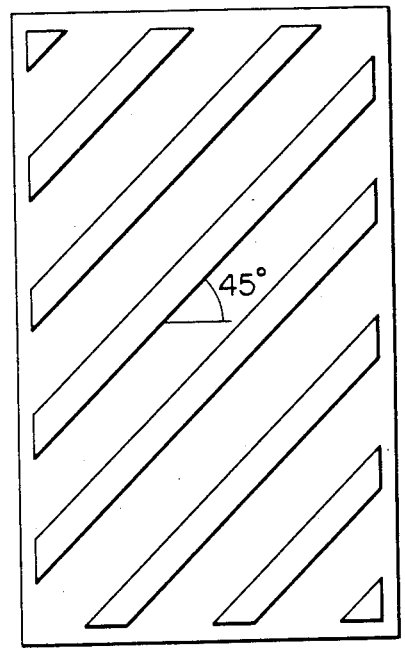
FIG. 2 is an enlarged front elevation view to show an etching pattern of one of the strips of the amorphous magnetic alloy used in the first embodiment of the present invention.

After forming slits by etching as shown in FIG. 2 and annealing at a temperature higher than the Curie temperature but lower than the crystallization temperature, the strips of the amorphous magnetic alloy were bonded to the surface of the rotary shaft 1 in the form of a collar conforming to the circumference of the rotary shaft 1 having the diameter of 20 mm. In the manner described above, the strips 2a and 2b of the amorphous magnetic alloy were helically bonded to the surface of the rotary shaft 1 while making angles of $+45°$ and $-45°$ respectively with respect to the axial direction of the rotary shaft 1.

A bismaleimide triazine resin (BT2164 made by Mitsubishi Gas Chemical Company Inc.), was used for bonding the strips 2a and 2b of the amorphous magnetic alloy to the surface of the rotary shaft 1, and the bonding continued for 2 hours at a temperature of $220°$ C. higher by $70°$ C. than a highest operating temperature, $150°$ C., of the torque sensor. The thickness of the bonding resin layer was smaller than about 5 μm. As a result of measurement of the strength of the bonding resin layer, it was confirmed that at least 99.5% of a strain produced on the surface of the rotary shaft 1 due to transmission of a torque in an operating temperature range, $-50°$ C. to $+150°$ C., of the torque was transmitted to the strips 2a and 2b of the amorphous magnetic alloy through the bonding resin layer.

Figure 3:
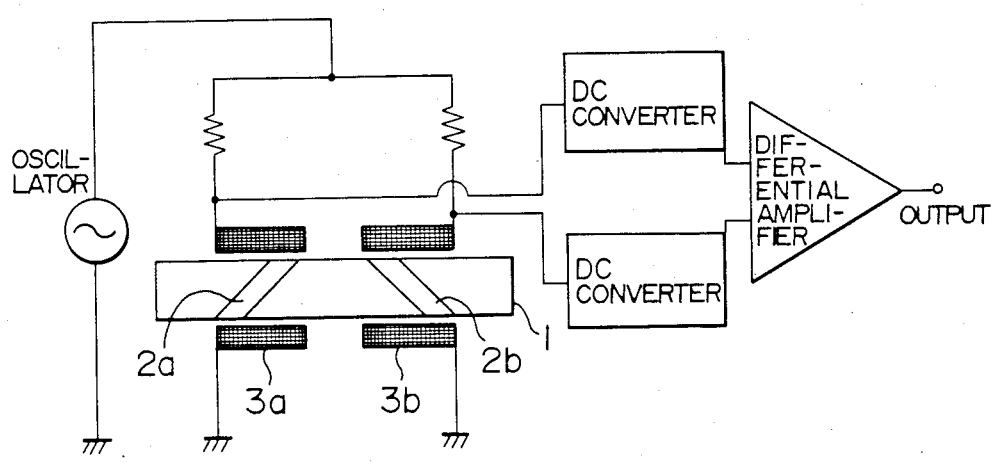
FIG. 3 is an electrical circuit diagram of a detection circuit used in the first embodiment of the present invention.

Coils 3a and 3b wound around bobbins 5a and 5b of Teflon respectively were disposed in coaxial relation with the rotary shaft 1, so that the permeabilities of the strips 2a and 2b of the amorphous magnetic alloy bonded to the rotary shaft 1 can be converted into corresponding inductances respectively. The number of turns of each of the coils 3a and 3b was 200. The coils 3a and 3b were connected to a detection circuit 4 having a structure as schematically shown in FIG. 3. In the detection circuit, an a.c. magnetic field having a frequency of 60 kHz and an intensity of 1 oersted is generated for exiciting the strips 2a and 2b of the amorphous magnetic alloy.

When a torque is transmitted to the rotary shaft 1, a strain is produced on the surface of the rotary shaft 1 thereby changing the permeabilities of the strips 2a and 2b of the amorphous magnetic alloy. As a result, the inductances of the coils 3a and 3b are changed correspondingly. When, for example, a clockwise torque is transmitted to the rotary shaft 1, the inductance of the coil 3a increases, while that of the coil 3b decreases. Thus, when a differential output representing the difference between the inductances of the coils 3a and 3b is derived, both the magnitude and the direction of the torque can be detected at the same time.

An internal strain attributable to the difference between the coefficient of thermal expansion of the amorphous magnetic alloy and that of the material of the rotary shaft 1 appears when the method of bonding according to the present invention is employed. The strain $\epsilon$ is defined by the following equation (1):

$$\epsilon = (\alpha_b - \alpha_a) \times (T_a - T_b) \tag{1}$$

where $T_a$ is the temperature of bonding, $T_b$ is the operating temperature of the torque sensor, $\alpha_a$ is the coefficient of linear thermal expansion of the amorphous magnetic alloy, and $\alpha_b$ is that of the material of the rotary shaft 1.

The equation (1) teaches that $\epsilon$ represents an internal compressive strain when $\epsilon > 0$ but represents an internal tensile strain when $\epsilon < 0$.

Figure 4:
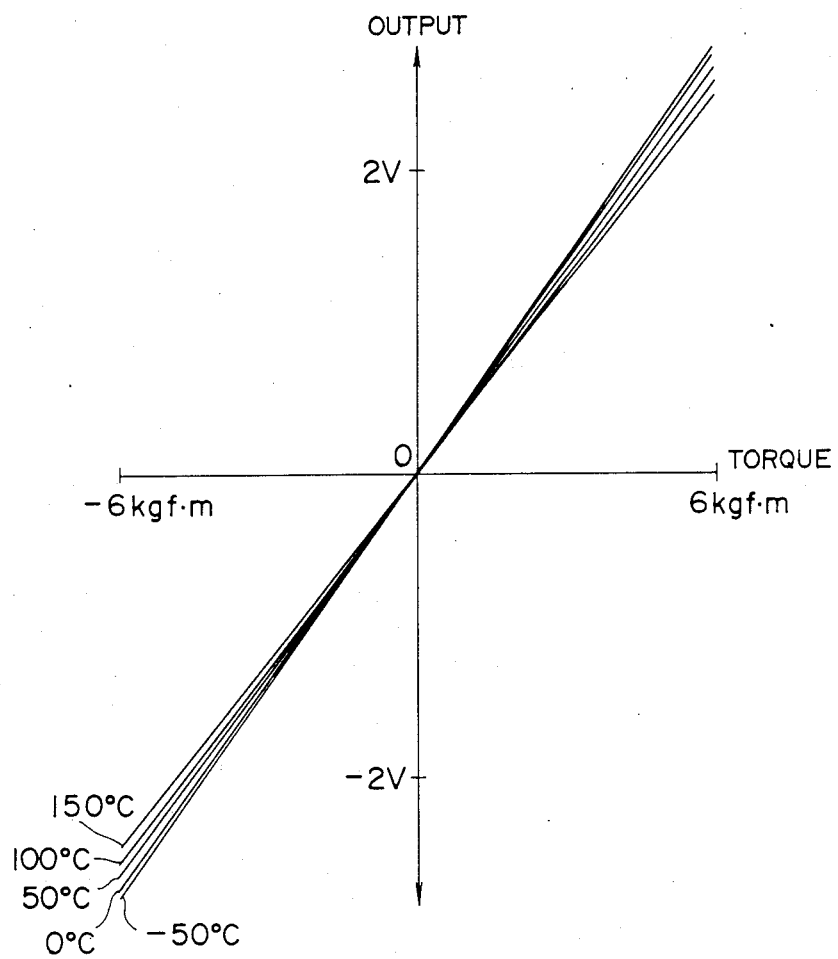
FIGS. 4, 5 and 6 are graphs showing the temperature characteristic of the torque sensor.

When the torque sensor according to the present invention operates in its operating temperature range of $-50°$ C. to $+150°$ C., the value of the internal compressive strain $\epsilon$ in the strips 2a and 2b of the amorphous magnetic alloy lies within a range of $112 \times 10^{-6} < \epsilon < 432 \times 10^{-6}$. That is, when no torque is applied to the amorphous magnetic alloy strips 2a and 2b, they have the internal compressive strain $\epsilon$ within the above range in advance. The temperature characteristic of the torque sensor in this case is shown in FIG. 4. The horizontal axis represents the value of the torque transmitted to the rotary shaft 1, and the torque was changed between $-6$ kgf.m and $+6$ kgf.m. The vertical axis represents the differential output of the detection circuit 4 at measured temperatures of $150°$ C., $100°$ C., $50°$ C., $0°$ C. and $-50°$ C. At these temperatures, the internal compressive strain $\epsilon$ induced in the amorphous magnetic alloy in the state that the applied torque thereto is zero is $112 \times 10^{-6}$, $192 \times 10^{-6}$, $272 \times 10^{-6}$, $352 \times 10^{-6}$ and $432 \times 10^6$ respectively. It will be seen in FIG. 4 that the output of the torque sensor is satisfactory in the operating temperature range of $-50°$ C. to $+150°$ C.

Figure 5:
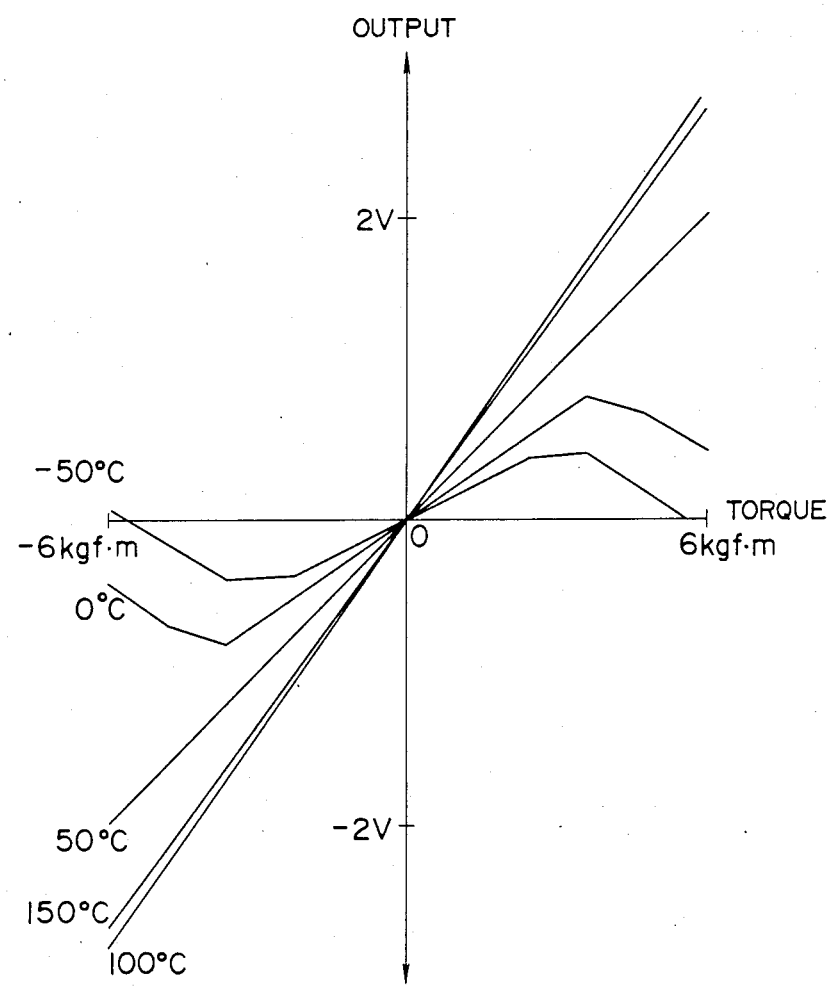

How the output of the torque sensor changes when the internal compressive strain $\epsilon$ is larger than that described above under the condition that no torque is applied to the sensor will now be discussed. A torque sensor in which the structure, the method of bonding, the material of the amorphous magnetic alloy, etc. were entirely the same as those of the torque sensor described with reference to FIG. 1 was made, except that the material of the rotary shaft 1 was replaced by a steel material type S45C having a coefficient of linear thermal expansion of $11.6 \times 10^{-6}$ (1/°C.). FIG. 5 shows the temperature characteristics of such a torque sensor measured at $150°$ C., $100°$ C., $50°$ C., $0°$ C. and $-50°$ C. In such a case, the internal compressive strain $\epsilon$ induced in the amorphous magnetic alloy at these temperatures was $266 \times 10^{-6}$, $456 \times 10^{-6}$, $646 \times 10^{-6}$, $836 \times 10^{-6}$ and $1026 \times 10^{-6}$, respectively, under the condition that the torque is not applied to the alloy at all. It can be seen that the sensitivity of the torque sensor is substantially lost when the internal compressive strain $\epsilon$ becomes as large as about $800 \times 10^{-6}$.

Figure 6:
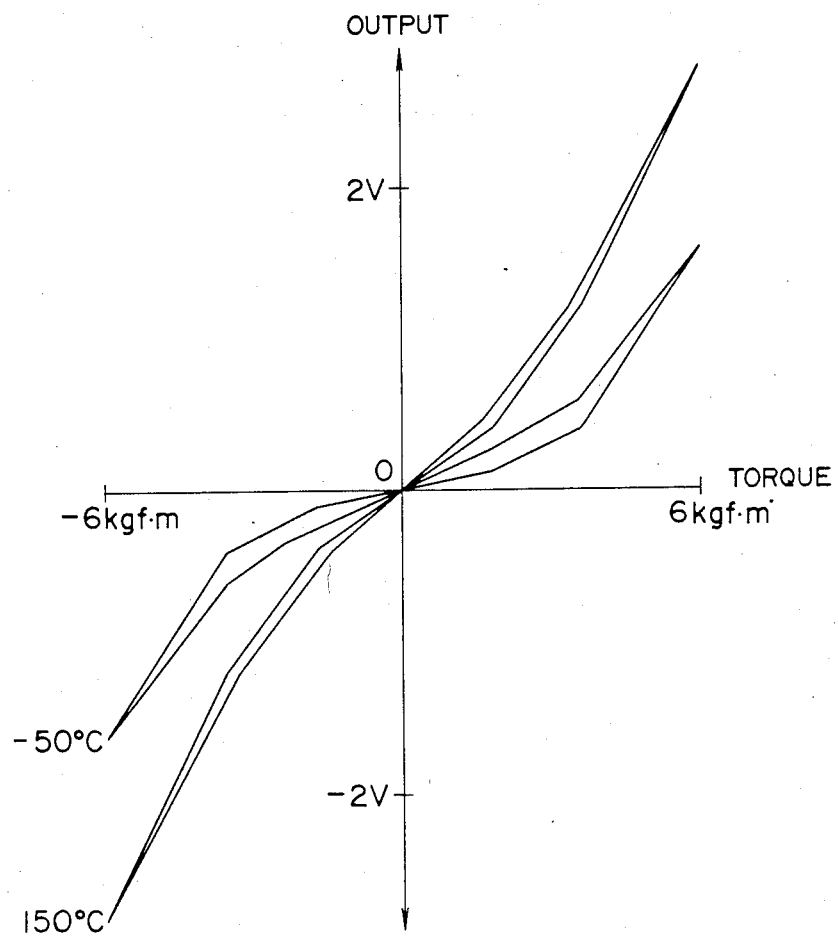

How the output of the torque sensor changes when the amorphous magnetic alloy is subjected to an internal tensile strain will now be discussed. A torque sensor in which the structure, the method of bonding, the material of the amorphous magnetic alloy, etc. were entirely the same as those of the torque sensor described with reference to FIG. 1 was made, except that the material of the rotary shaft 1 was replaced by a steel material having a composition of 42% Ni-Fe and having a coefficient of linear thermal expansion of $6.7 \times 10^{-6}$ (1/°C.) in a temperature range of $-30°$ C. to 250° C. FIG. 6 shows the output of such a torque sensor measured at 150° C. and $-50°$ C. In this case, the coefficient of linear thermal expansion coefficient of the amorphous magnetic alloy is larger by $1.1 \times 10^{-6}$ (1/°C.) than that of the material of the rotary shaft 1, and the amorphous magnetic alloy is subjected to internal tensile strains $\epsilon$ of $-77 \times 10^{-6}$ and $-297 \times 10^{-6}$ at the measured temperatures of 150° C. and $-50°$ C. respectively under the condition that the torque is not applied to the alloy at all. It will be apparent from FIG. 6 that a hysteresis occurs in the output of the torque sensor under such a situation. Also, the sensitivity of the torque sensor was reduced when the value of the torque came near to 0 kgf.m.

For the purpose of further detailed research and investigation, the values of the internal compressive strain and internal tensile strain were changed over a wide range on the condition that the state without the applied torque was kept. In the research, an alloy composition selected from the group consisting of Fe-Si-B, Fe-Cr-Si-B, Fe-Ni-Si-B, Fe-Ni-Si-Cr-B, Fe-Ni-Mo-B and Fe-Co-Si-B and having a coefficient of linear thermal expansion of $6.5 \times 10^{-6}$ to $13.5 \times 10^{-6}$ (1/°C.) and a saturation magnetostrictive constant of $3 \times 10^{-6}$ to $35 \times 10^{-6}$ was used as the material of the amorphous magnetic alloy, and a metal selected from the group consisting of stainless steels, 42–48% Ni-Fe steels, carbon steels and titanium was used as the material of the rotary shaft 1. A bonding agent such as an epoxy resin or a polyimide resin was used to bond the strips 2a and 2b of the amorphous magnetic alloy to the surface of the rotary shaft 1 in a temperature range of 150° C. to 320° C. As a result of a test in which the amorphous magnetic alloy was subjected to various compressive and tensile strains, it was found that a satisfactory output free from any reduction in sensitivity could be generated only when the value of the compressive strain lied in a range of $20 \times 10^{-6}$ to $700 \times 10^{-6}$. It was also found that a hysteresis occurred in the output of the torque sensor when the amorphous magnetic alloy was subjected to a tensile strain and when the value of the compressive strain $\epsilon$ was smaller than $20 \times 10^{-6}$. It was also found that the sensitivity of the torque sensor decreased when the value of the compressive strain $\epsilon$ was larger than $700 \times 10^{-6}$. The above discussion proves that the conclusion described above holds when a strain produced on the surface of the rotary shaft 1 is exactly transmitted by the bonding resin layer to the strips 2a and 2b of the amorphous magnetic alloy regardless of whether the material of the rotary shaft 1 is a magnetic metal or a nonmagnetic metal and also regardless of the kind of the resin and the temperature of bonding the strips 2a and 2b of the amorphous magnetic alloy by the resin to the surface of the rotary shaft 1.

From the aspects of the useful service life, cost, productivity, etc. of the torque sensor, preferred materials of the rotary shaft 1 include a stainless steel which is corrosion resistive, a steel of type S45C which is inexpensive, an Fe-Ni steel whose coefficient of thermal expansion is easily adjustable, and titanium which has excellent mechanical properties.

Preferred bonding agents include an epoxy resin, a bismaleimide triazine resin and a polyimido resin all of which are resistive to heat.

Thus, when the strips of the amorphous magnetic alloy are subjected to a compressive strain lying within a predetermined range, the output of the torque sensor is freed from the hysteresis, and the linearity of the output is improved. It has been confirmed that the improved linearlity of the output of the torque sensor is attributable to the fact that an easy axis of magnetization is formed in the strips of the amorphous magnetic alloy in a direction perpendicular with respect to the surface.

The first embodiment of the present invention has referred to the bonding of the strips of the amorphous magnetic alloy to the surface of the rotary shaft. However, the strips of the amorphous magnetic alloy may be fixed to the surface of the rotary shaft by means such as sputtering or evaporation. Then, when the strips of the amorphous magnetic alloy are suitably heat-treated utilizing the difference between the coefficient of thermal expansion of the amorphous magnetic alloy and that of the material of the rotary shaft so as to form an easy axis of magnetization perpendicular with respect to the surface, such a torque sensor is as effective as the first embodiment of the present invention. Further, when an amorphous magnetic alloy having a negative magnetostriction is used to form the strips, the strips may be subjected to an internal tensile strain so as to form an easy axis of magnetization perpendicular with respect to the surface. Such a torque sensor is also as effective as the first embodiment of the present invention.

Figure 7:
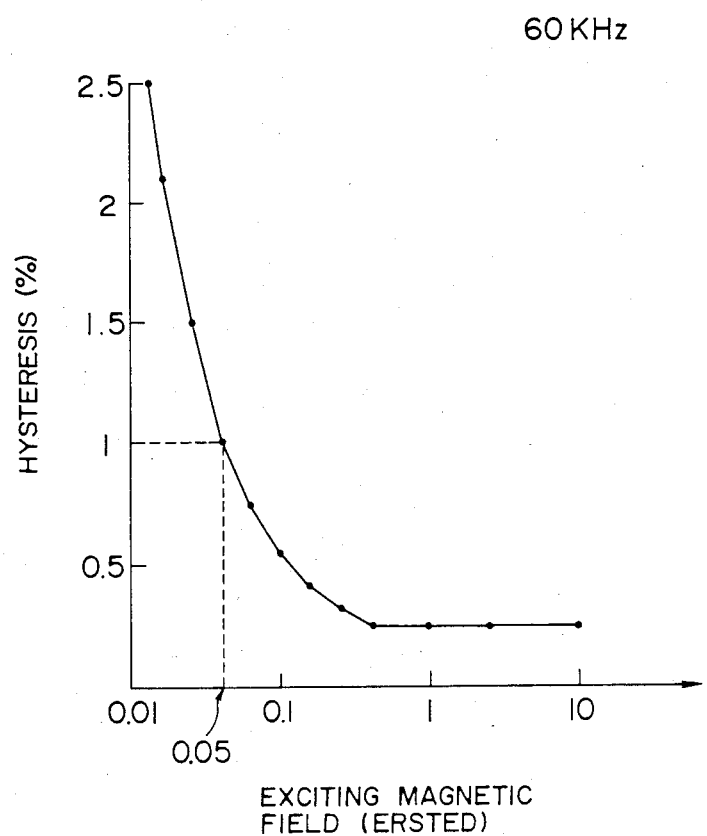
FIG. 7 is a graph showing the dependence of a hysteresis of the torque sensor output on the intensity of an exciting magnetic field.

As described already, the torque sensor generates an output free from any sensitivity reduction when the compressive strain lies within the range of $20 \times 10^{-6}$ to $700 \times 10^{-6}$ in the state that no torque is applied. A hysteresis of the output of the torque sensor changes greatly depending on the intensity of the exciting magnetic field acting upon the strips of the amorphous magnetic alloy. The hysteresis of the output of the torque sensor was measured while changing the intensity of the exciting magnetic field from 0.01 to 10 oersteds. FIG. 7 shows the result of measurement at a frequency of 60 kHz. The horizontal axis represents the intensity of the exciting magnetic field, and the vertical axis represents the ratio of the width of the hysteresis to the width of the output in a torque range of $-6$ kgf.m to $+6$ kgf.m. It will be seen in FIG. 7 that the hysteresis is smaller than 1% when the intensity of the exciting magnetic field is in the range of 0.05 to 10 oersteds. The higher the intensity of the exciting magnetic field, the hysteresis tends to become smaller.

Although the above description has referred to the hysteresis at the frequency of 60 kHz, it has been confirmed that the above tendency applies also to a frequency range of 1 to 150 kHz.

Figure 8:
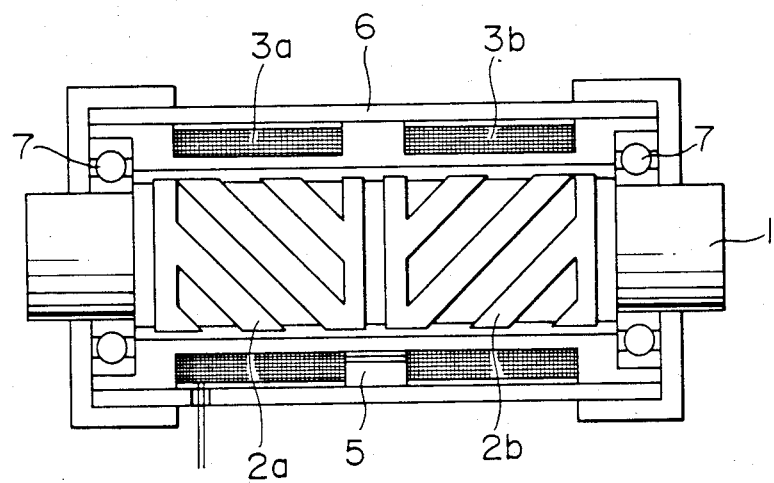
FIG. 8 is a partly cut-away, front elevation view showing the structure of a second embodiment of the torque sensor according to the present invention.

FIG. 8 shows the structure of a second embodiment of the torque sensor according to the present invention. In FIG. 8, the same reference numerals are used to designate the same parts appearing in FIG. 1 to dispense with explanation of those parts. In FIG. 8, the reference numerals 5 and 6 designate a bobbin made of Teflon and a soft magnetic yoke made of a 45% Ni-Fe alloy respectively. The yoke 6 is disposed in coaxial relation with the rotary shaft 1 at a location outside of the coils 3a, 3b and is rotatably mounted at both ends on the rotary shaft 1 through ball bearings 7, so that the yoke 6 constitutes a magnetic circuit together with the coils 3a, 3b and the strips 2a, 2b of the amorphous magnetic alloy. The rotary shaft 1 was made of a steel type S35C having a coefficient of thermal expansion of $11.8 \times 10^{-6} (1/°C.)$ and had a diameter of 35 mm.

The amorphous magnetic alloy used to form the strips 2a and 2b was of a composition Fe-Ni-Cr-Si-B having a saturation magnetostriction of $11 \times 10^{-6}$ and a coefficient of thermal expansion of $11.3 \times 10^{-6} (1/°C.)$ The coefficient of thermal expansion of the amorphous magnetic alloy was smaller by $0.5 \times 10^{-6} (1/°C.)$ than that of the material of the rotary shaft 1. The strips 2a and 2b of the amorphous magnetic alloy were bonded to the surface of the rotary shaft 1 by a bismaleimide triazine resin which is one of polyimide type bonding agents, and the bonding continued for 1 hour at a temperature of 250° C. higher by 100° C. than the highest operating temperature of the torque sensor. An internal compressive strain was produced in the strips of the amorphous magnetic alloy. The value of the compressive strain $\epsilon$ lied within a range of $20 \times 10^{-6}$ to $700 \times 10^{-6}$ in the operating temperature range of the torque sensor. The intensity of the exciting magnetic field was 1 oersted.

Figure 9:
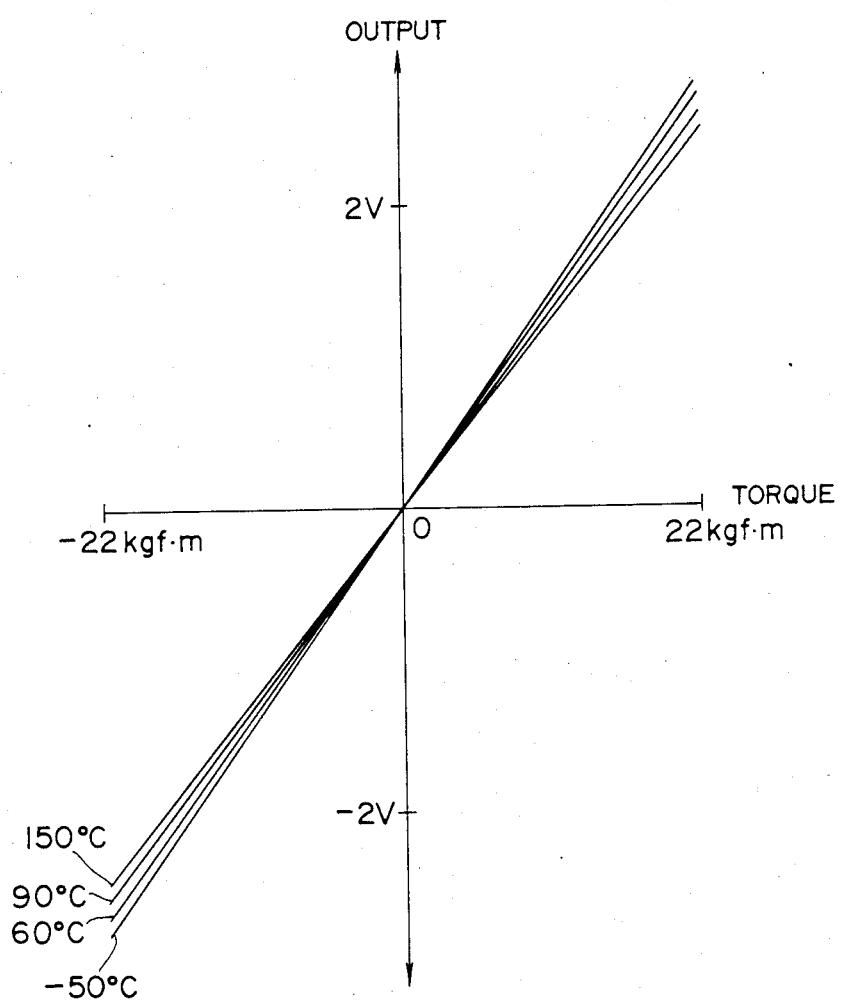
FIG. 9 is a graph showing the temperature characteristic of the second embodiment of the present invention.

FIG. 9 shows the output of the torque sensor at $-50°$ C., 60° C., 90° C. and 150° C. The measured range of the torque was $-22$ kgf.m to $+22$ kgf m. The output of the torque sensor had a small hysteresis smaller than 1%, and the sensitivity of the output was satisfactory. Further, by the provision of the yoke 6, the torque sensor could stably operate without being affected by an external disturbing magnetic field.

In the second embodiment of the present invention, the 45% Ni-Fe steel is used as the material of the soft magnetic yoke 6. However, any other suitable material such as a ferrite can be used to exhibit the same effect.

Figure 10:
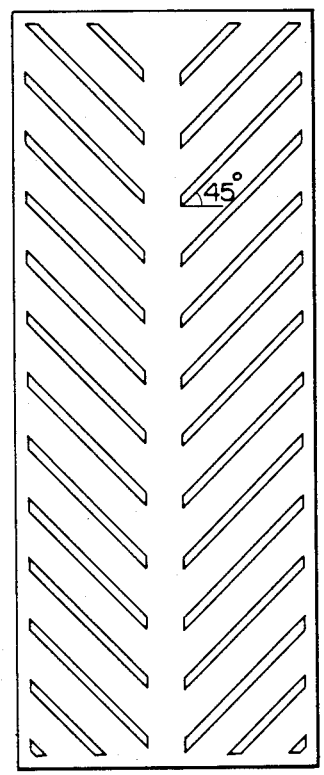
FIG. 10 is a front elevation view showing an etching pattern of a single strip of the amorphous magnetic alloy used in the second embodiment of the present invention.

FIG. 10 shows an etching pattern of a single strip of an amorphous magnetic alloy used in a third embodiment of the torque sensor according to the present invention. The structure, the method of bonding, the material of the rotary shaft, the composition of the amorphous magnetic alloy, etc. of the torque sensor are entirely the same as those of the second embodiment.

In the third embodiment of the torque sensor, slits of $+45°$ and $-45°$ are formed in the single strip of the amorphous magnetic alloy so as to reduce the size of the torque sensor. The output, hysteresis, etc. of the torque sensor were as satisfactory as those of the second embodiment.

We claim:

1. A torque sensor comprising a rotary shaft, a pair of strips of a magnetostrictive amorphous magnetic alloy helically fixed to the surface of said rotary shaft to make a predetermined angle with respect to the axial direction of said rotary shaft, a pair of independent coils disposed outside of the respective strips of the amorphous magnetic alloy in a relation coaxial with and spaced apart by a predetermined distance from said rotary shaft, and electrical means detecting a strain produced on the surface of said rotary shaft due to transmission of a torque to said rotary shaft by detecting changes in the inductances of said coils due to changes in the permeabilities of said strips of the amorphous magnetic alloy, thereby detecting the magnitude and direction of the torque on the basis of the difference between the inductances of said coils, wherein the saturation magnetostriction of said amorphous magnetic alloy is selected to lie within a range of $3 \times 10^{-6}$ to $35 \times 10^{-6}$, and the coefficient of thermal expansion of said amorphous magnetic alloy is selected to be smaller than that of the material of said rotary shaft so as to previously produce an internal compressive strain in said strips of the amorphous magnetic alloy.

2. A torque sensor according to claim 1, wherein said internal compressive strain lies within a range of $20 \times 10^{-6}$ to $700 \times 10^{-6}$.

3. A torque sensor according to claim 1, wherein the material of said rotary shaft is selected from the group consisting of carbon steels, Ni-Fe steels, titanium and stainless steels.

4. A torque sensor according to claim 1, wherein said strips of the amorphous magnetic alloy are excited by a magnetic field having a frequency range of 1 to 150 kHz and an intensity range of 0.05 to 10 oersteds.

5. A torque sensor according to claim 1, wherein said strips of the amorphous magnetic alloy are bonded to the surface of said rotary shaft by a bonding agent selected from the group consisting of a bismaleimide triazine resin, polyimide resins and epoxy resine.

* * * * *